United States Patent [19]
Fueki et al.

[11] Patent Number: 5,476,820
[45] Date of Patent: Dec. 19, 1995

[54] METHOD OF MANUFACTURING SEMICONDUCTOR GAS RATE SENSOR

[75] Inventors: Nobuhiro Fueki; Atsushi Inaba; Nariaki Kuriyama, all of Wako, Japan

[73] Assignee: Honda Giken Kogyo Kabushiki Kaisha, Tokyo, Japan

[21] Appl. No.: 384,786

[22] Filed: Feb. 6, 1995

[30] Foreign Application Priority Data

Feb. 4, 1994 [JP] Japan .................................. 6-012924

[51] Int. Cl.⁶ ............................ H01L 21/00; H01L 23/10
[52] U.S. Cl. .................... 437/250; 156/292; 73/514.03; 437/927; 148/DIG. 12; 148/DIG. 73
[58] Field of Search ............................ 156/290, 292, 156/321; 73/516 LM; 148/DIG. 73, DIG. 12; 437/927, 250

[56] References Cited

U.S. PATENT DOCUMENTS

| | | | |
|---|---|---|---|
| 5,107,707 | 4/1992 | Takahashi et al. | 73/516 LM |
| 5,164,218 | 11/1992 | Tsuruta et al. | 148/DIG. 12 |
| 5,385,046 | 1/1995 | Yamakawa et al. | 73/516 LM |

FOREIGN PATENT DOCUMENTS 3-60133  3/1991  Japan .
4-370776 12/1992 Japan .
4-370767 12/1992 Japan .
5-2027    1/1993  Japan .
6-120525  4/1994  Japan .

*Primary Examiner*—Brian E. Hearn
*Assistant Examiner*—Leon Radomsky
*Attorney, Agent, or Firm*—Lyon & Lyon

[57] ABSTRACT

A semiconductor gas rate sensor includes a base composed of a first semiconductor substrate and a second semiconductor substrate bonded thereto by a thermosetting adhesive layer deposited on a mating surface of the second semiconductor substrate, the base having a gas flow passage defined therein and a nozzle defined therein for injecting a gas flow into the gas flow passage, and a detector disposed in and extending across the gas flow passage for detecting a deflected state of the gas flow when an angular velocity acts on the base, the nozzle being formed between a recess defined in mating surface of the first semiconductor substrate and the mating surface of the second semiconductor substrate. To manufacture the semiconductor gas rate sensor, the first semiconductor substrate and the second semiconductor substrate are joined to each other with the thermosetting adhesive layer on the mating surface of the second semiconductor substrate, and thereafter, the first semiconductor substrate and the second semiconductor substrate are heated while the second semiconductor substrate is being kept underneath the first semiconductor substrate.

6 Claims, 5 Drawing Sheets ns="5,476,820"

METHOD OF MANUFACTURING SEMICONDUCTOR GAS RATE SENSOR

BACKGROUND OF THE INVENTION

1. Field of the Invention

The present invention relates to a method of manufacturing a semiconductor gas rate sensor for detecting an angular velocity acting on a base.

2. Description of the Related Art

A basic structure of a semiconductor gas rate sensor will be described below with reference to FIGS. 1 through 3 of the accompanying drawings.

The semiconductor gas rate sensor shown in FIG. 1 comprises a chip-like base 6 composed of a first semiconductor substrate 1 and a second semiconductor substrate 3 with a thermosetting adhesive layer 2 disposed on a mating surface thereof. The first and second semiconductor substrates 1, 3 are bonded to each other by the thermosetting adhesive layer 2 interposed therebetween. As shown in FIG. 2, the base 6 has a gas flow passage 4 defined therein and a nozzle port 5 defined therein for ejecting a gas into the gas flow passage 4. A pair of heat wires 7, 8 composed of thermosensitive resistor elements, respectively, is disposed in and extends across the gas flow passage 4. The heat wires 7, 8 serve as a detector for detecting a deflected state of a gas flow at the time an angular velocity acts on the base 6. The base 6 also has a gas inlet hole 9 defined therein for connection to a micropump (not shown), and a gas reservoir 10 defined therein between the gas flow passage 4 and the gas inlet hole 9 for reducing pump-induced pressure pulsations of the gas introduced from the gab inlet hole 9 to allow a stable gas flow to be supplied from the nozzle 5 into the gas flow passage 4.

The semiconductor gas rate sensor is a very small, precision device having a thickness of about 1200 μm, with the nozzle 5 having a width of about 800 μm. Heretofore, the semiconductor gas rate sensor has been manufactured as follows:

First, heat wires 7, 8 of platinum or the like are evaporated on the mating surface of the first semiconductor substrate 1 (see FIG. 3). Then, the mating surface of the first semiconductor substrate 1 is etched to define therein a recess 11 which serves as a portion of the gas flow passage 4, a recess 12 which forms the nozzle 5 when combined with a mating surface of the second semiconductor substrate 3, and a recess 13 which serves as a portion of the gas reservoir 10. Specifically, the recess 11 is formed such that a bridge 18 extends across the recess 11, and the heat wires 7, 8 are placed on the bridge 18 so as to extend across the gas flow passage 4.

Thereafter, the mating surface of the second semiconductor substrate 3 is etched to define therein recesses 15, 16 which form the gas flow passage 4 and the gas reservoir 10, respectively, when combined with the recesses 11, 13 in the first semiconductor substrate 1. The recess 16 is defined in communication with the gas inlet hole 9. The adhesive layer 2 which is made of epoxy resin is deposited on the mating surface of the second semiconductor substrate 3.

Then, as shown in FIGS. 2 and 4 of the accompanying drawings, the second semiconductor substrate 3 is joined by the adhesive layer 2 to the first semiconductor substrate 1 which is positioned underneath the second semiconductor substrate 3. Thereafter, while keeping the first semiconductor substrate 1 underneath the second semiconductor substrate 3, the first and second semiconductor substrates 1, 3 are heated to set the adhesive layer 2, whereupon the first and second semiconductor substrates 1, 3 are firmly bonded together, completing the semiconductor gas rate sensor.

However, since the first and second semiconductor substrates 1, 3 are heated while keeping the first semiconductor substrate 1 underneath the second semiconductor substrate 3, the adhesive layer 2 over the recess 12 is melted and softened in an initial stage of the heating step. The softened adhesive layer 2 then flows toward and sags from an upper corner of the recess 12 due to gravity, and is finally set, as shown in FIG. 5 of the accompanying drawings. The adhesive layer 2 thus set in the sagging state in the recess 12 makes the nozzle 5 asymmetrical in shape, and tends to deflect a gas flow as it is injected from the nozzle 5 into the gas flow passage 4. The gas flow is deflected to a greater extent the larger the amount of gas is. When this happens, the detector composed of the heat wires 7, 8 detects an angular velocity signal even though no angular velocity is acting on the base 6. Consequently, the semiconductor gas rate sensor is defective and cannot be used. The conventional process of manufacturing the semiconductor gas rate sensor suffers from a poor yield.

One solution is to place a spacer (not shown) on the area of the mating surface of the second semiconductor substrate 3 over the recess 12 to eliminate the adhesive layer 2 from only the mating surface area over the recess 12. However, because the recess 12 normally has a width of about 800 μm, it is practically highly difficult to get rid of the adhesive layer 2 from only the mating surface area over the recess 12. Actually, as shown in FIG. 6 of the accompanying drawings, asymmetrical gaps 19 are created between opposite upper edges of the recess 12 and the mating surface of the second semiconductor substrate 3. Inasmuch as the gas leaks into the gaps 19 during operation of the semiconductor gas rate sensor, the gas flow from the nozzle 5 into the gas flow passage 4 is still deflected.

SUMMARY OF THE INVENTION

It is therefore an object of the present invention to provide a method of manufacturing a semiconductor gas rate sensor while preventing an adhesive from flowing into a nozzle when joined semiconductor substrates are heated, so that a good gas flow can pass through the nozzle without undue deflection.

Another object of the present invention is to provide a method of efficiently manufacturing a semiconductor gas rate sensor in which a good gas flow can pass through the nozzle without undue deflection.

Still another object of the present invention is to provide a method of manufacturing a semiconductor gas rate sensor while allowing an adhesive layer to be deposited efficiently and positionally accurately on the mating surface of a second semiconductor substrate which is very small in size.

To achieve the above objects, there is provided in accordance with the present invention a method of manufacturing a semiconductor gas rate sensor including a base composed of a first semiconductor substrate and a second semiconductor substrate bonded thereto by a thermosetting adhesive layer deposited on a mating surface of the second semiconductor substrate, the base having a gas flow passage defined therein and a nozzle defined therein for injecting a gas flow into the gas flow passage, and a detector disposed in and extending across the gas flow passage for detecting a deflected state of the gas flow when an angular velocity acts on the base, the nozzle being formed between a recess defined in mating surface of the first semiconductor substrate and the mating surface of the second semiconductor substrate, the method comprising the steps of joining the first semiconductor substrate and the second semiconductor substrate with the thermosetting adhesive layer on the mating surface of the second semiconductor substrate, and thereafter, heating the first semiconductor substrate and the second semiconductor substrate while the second semiconductor substrate is being kept underneath the first semiconductor substrate.

According to the present invention, there is also provided a method of manufacturing a semiconductor gas rate sensor including a base composed of a first semiconductor substrate and a second semiconductor substrate bonded thereto and having a gas flow passage defined therein and a nozzle defined therein for injecting a gas flow into the gas flow passage, and a detector disposed in and extending across the gas flow passage for detecting a deflected state of the gas flow when an angular velocity acts on the base, the method comprising the steps of fabricating the detector on either a mating surface of the first semiconductor substrate or a mating surface of the second semiconductor substrate, defining a first recess in either the mating surface of the first semiconductor substrate or the mating surface of the second semiconductor substrate, the recess serving as the nozzle when the first semiconductor substrate and the second semiconductor substrate are joined to each other, defining a second recess in the mating surface of the first semiconductor substrate, the second recess serving as the nozzle when combined with the mating surface of the second semiconductor substrate, depositing a thermosetting adhesive layer on the mating surface of the second semiconductor substrate, joining the first semiconductor substrate to the second semiconductor substrate with the thermosetting adhesive layer deposited on the mating surface of the second semiconductor substrate, and heating the first semiconductor substrate and the second semiconductor substrate have been joined to each other while the second semiconductor substrate is being kept underneath the first semiconductor substrate, thereby setting the thermosetting adhesive layer.

To bond the first and second semiconductor substrates to each other, they are heated while keeping the second semiconductor substrate with the thermosetting adhesive layer underneath the first semiconductor substrate, i.e., while keeping the second recess serving as the nozzle above the second semiconductor substrate. Therefore, the adhesive layer above the second recess which is melted and softened in an initial stage of the heating step does not sag into the second recess, allowing the nozzle to maintain its symmetrical shape.

The first semiconductor substrate may be joined to the second semiconductor substrate while the second semiconductor substrate is being kept underneath the first semiconductor substrate. Therefore, the first and second semiconductor substrates may not be required to be reversed or turned upside down, but may be directly sent to the heating step. Consequently, the first and second semiconductor substrates can be joined and heated successively efficiently.

The thermosetting adhesive layer may be deposited on the second semiconductor substrate by being transferred from a film onto the mating surface of the second semiconductor substrate. In this manner, the thermosetting adhesive layer can be deposited highly efficiently on the second semiconductor substrate which is very small in size.

The first and second recesses may be defined etching the mating surface.

The detector may be fabricated by evaporating thermosensitive resistor elements of metal on either the mating surface of the first semiconductor substrate or the mating surface of the second semiconductor substrate across the gas flow passage.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 7:
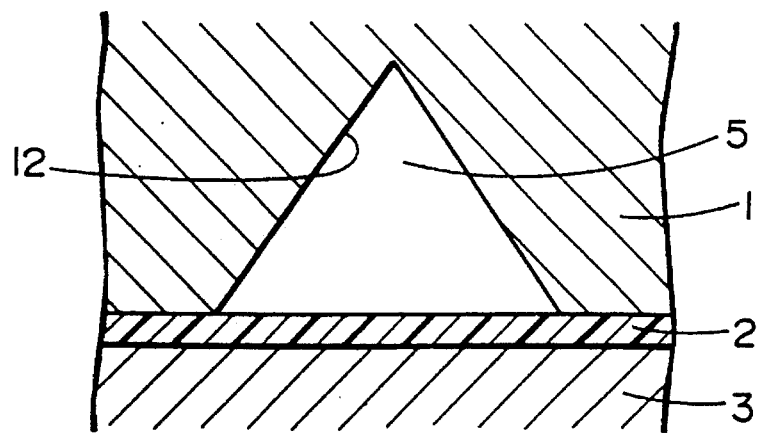
FIG. 7 is a fragmentary cross-sectional view illustrative of a method of manufacturing a semiconductor gas rate sensor according to the present invention.
Figure 8:
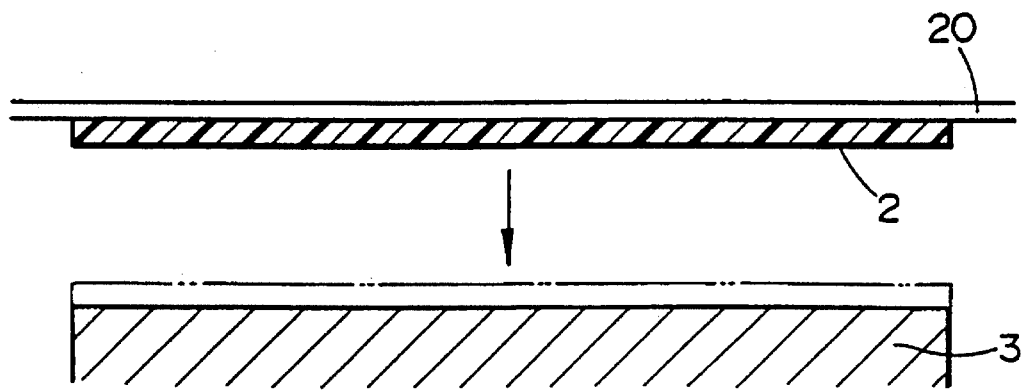
FIG. 8 is a cross-sectional view showing the manner in which an adhesive layer is deposited on the mating surface of a second semiconductor substrate.

A method of manufacturing a semiconductor gas rate sensor according to the present invention will be described below primarily with reference to FIGS. 7 through 9.

A semiconductor gas rate sensor manufactured by the method according to the present invention is structurally identical to the semiconductor gas rate sensor shown in FIGS. 1 through 4 which is manufactured by the conventional process. Therefore, parts of thee semiconductor gas rate sensor manufactured by the method according to the present invention are denoted by reference numerals that are identical to those of the corresponding parts of the semiconductor gas rate sensor shown in FIGS. 1 through 4.

The method according to the present invention differs from the conventional process only with respect to the step of depositing a thermosetting adhesive layer 2 of epoxy resin on the mating surface of a second semiconductor substrate 3, the step of joining first and second semiconductor substrates 1, 3 to each other, and the step of heating the first and second semiconductor substrates 1, 3 after they are joined. Therefore, only these steps will be described below.

Figure 1:
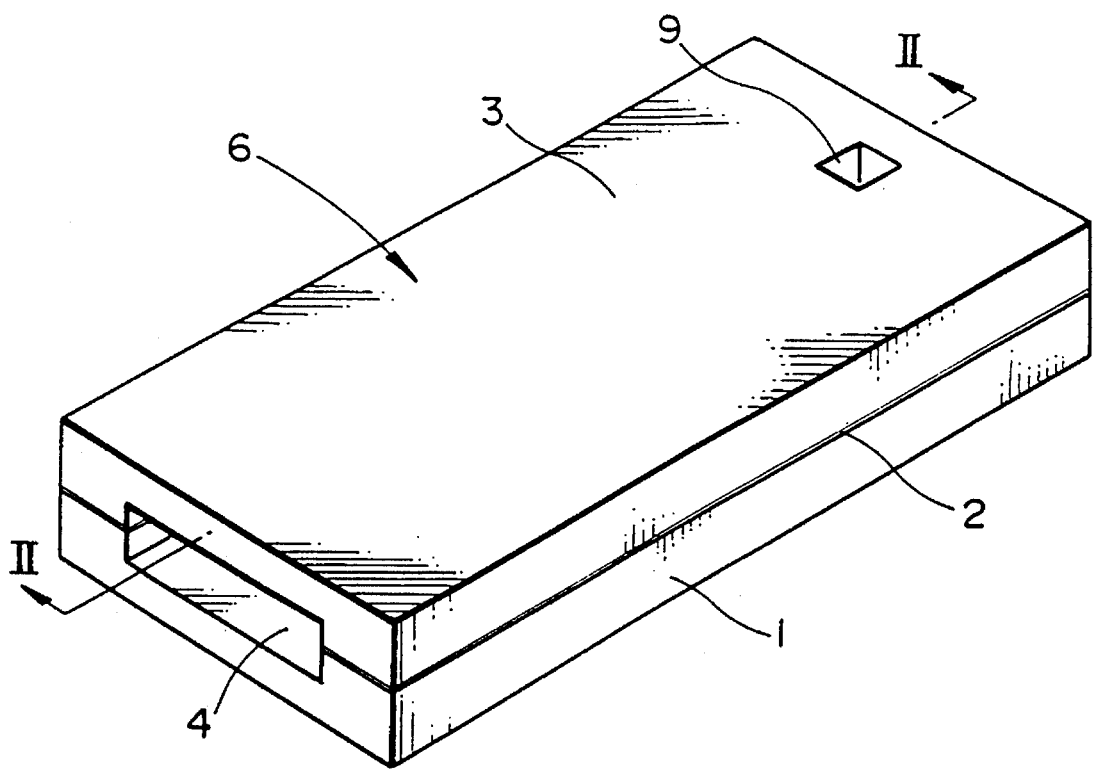
FIG. 1 is a perspective view of a semiconductor gas rate sensor.
Figure 2:
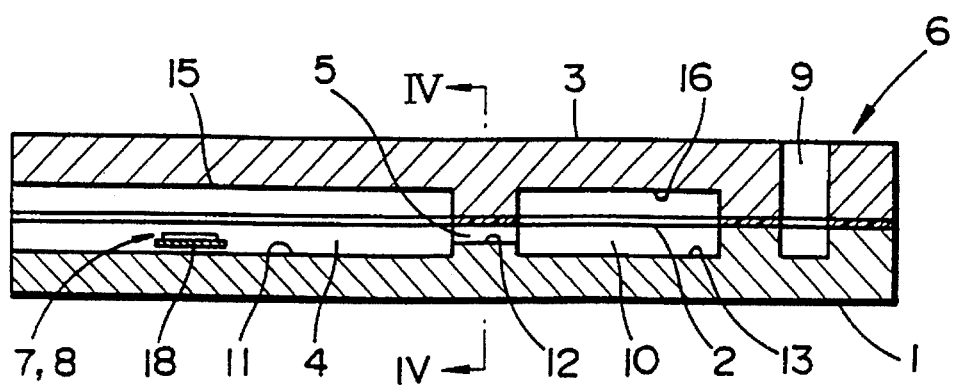
FIG. 2 is a cross-sectional view taken along line II—II of FIG. 1.
Figure 3:
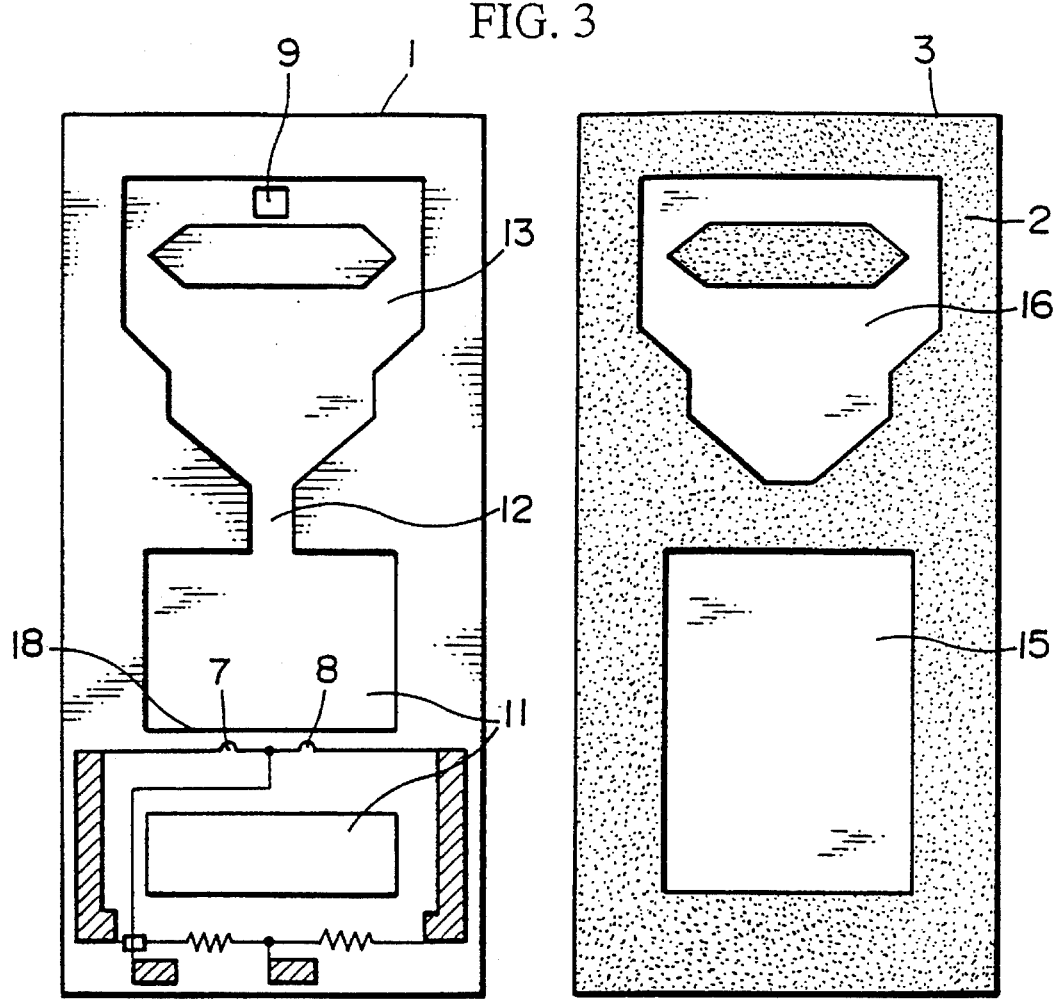
FIG. 3 is a plan view of first and second semiconductor substrates of the semiconductor gas rate sensor.
Figure 4:
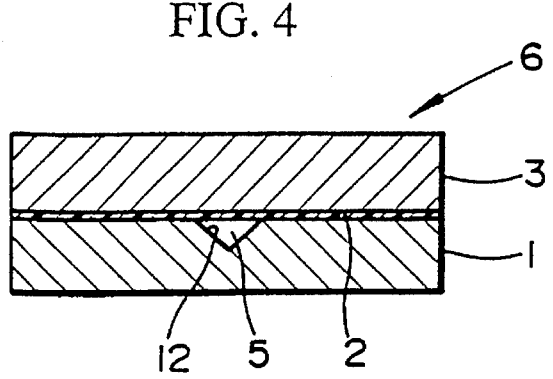
FIG. 4 is a cross-sectional view taken along line IV—IV of FIG. 2.
Figure 5:
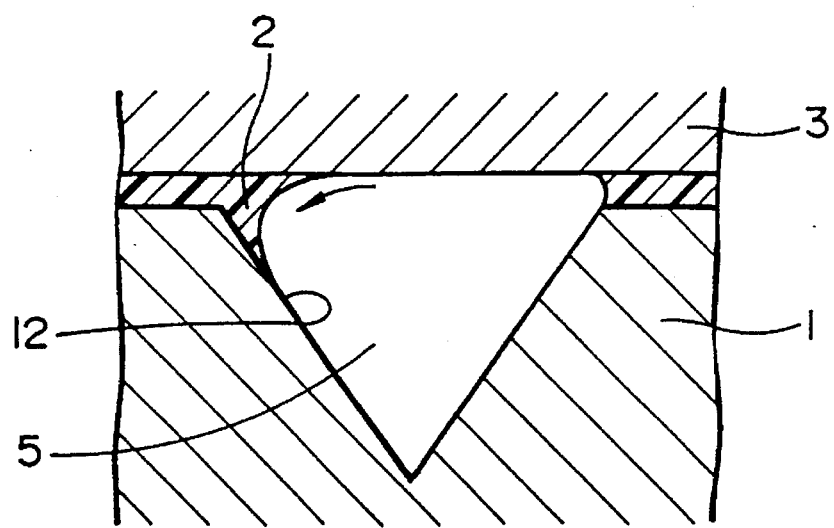
FIG. 5 is a fragmentary cross-sectional view illustrative of a conventional process of manufacturing a semiconductor gas rate sensor.
Figure 6:
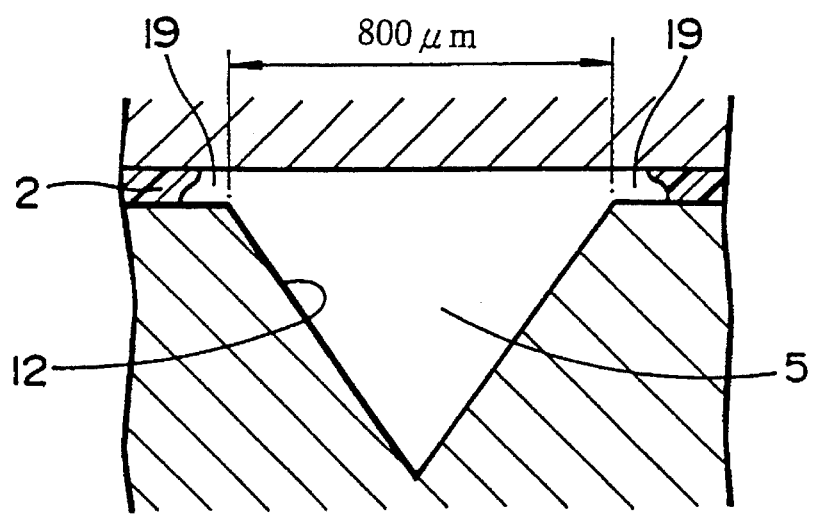
FIG. 6 is a fragmentary cross-sectional view illustrative of another conventional process of manufacturing a semiconductor gas rate sensor.

First, the step of depositing a thermosetting adhesive layer 2 of epoxy resin on the mating surface of a second semiconductor substrate 3 will be described below with reference to FIGS. 3 and 8. In this step, a thermosetting adhesive layer 2 of epoxy resin, which has a thickness of about 12 μm and is not flowable at normal temperature, is transferred from a film 20 of polyimide or the like onto the mating surface of a second semiconductor substrate 3. The thermosetting adhesive layer 2 of epoxy resin has a shape corresponding to the mating surface of the second semiconductor substrate 3, i.e., a shape devoid of recesses 15, 16 defined in the second semiconductor substrate 3, as shown in FIG. 3. Therefore, when the first and second semiconductor substrates 1, 3 are joined, the adhesive layer 2 is interposed therebetween in an area excluding recesses 11, 13 defined in the first semiconductor substrate 1. The adhesive layer 2 is positioned over the recess 12, thus forming the nozzle 5. In this manner, the adhesive layer 2 can be deposited efficiently and positionally accurately on the mating surface of the second semiconductor substrate 3 which is very small in size.

The step of joining first and second semiconductor substrates 1, 3 to each other, and the step of heating the first and second semiconductor substrates 1, 3 after they are joined will successively be described below with reference to FIG. 7. In the joining step, the first semiconductor substrate 1 is joined to the second semiconductor substrate 3 while the second semiconductor substrate 3 with the adhesive layer 2 deposited on its mating surface is being kept underneath the first semiconductor substrate 1. After the first and second semiconductor substrates 1, 3 have been joined to each other, while still keeping the second semiconductor substrate 3 underneath the first semiconductor substrate 1, the first and second semiconductor substrates 1, 3 are heated at a predetermined temperature of about 150° C. to set the adhesive layer 2. The first and second semiconductor substrates 1, 3 are now bonded to each other, thereby completing a semiconductor gas rate sensor.

Since the second semiconductor substrate 3 is positioned underneath the first semiconductor substrate 1, i.e., the recess 12 defined in the first semiconductor substrate 1 is located above the second semiconductor substrate 3, the adhesive layer 2 below the recess 12 which is melted and softened in an initial stage of the heating step does not sag into the recess 12 and hence is not set in a sagging state in the recess 12. Consequently, the nozzle 5 maintains its symmetrical configuration, and prevents a gas flow from being deflected when it is introduced from the nozzle 5 into the gas flow passage 4. The semiconductor gas rate sensor is therefore capable of detecting an angular velocity with high accuracy. The method according to the present invention provides a high yield.

In the joining step, the first semiconductor substrate 1 is joined to the second semiconductor substrate 3 while the second semiconductor substrate 3 is being kept underneath the first semiconductor substrate 1. Thereafter, the first and second semiconductor substrates 1, 3 are heated while still keeping the second semiconductor substrate 3 underneath the first semiconductor substrate 1. Therefore, after the first and second semiconductor substrates 1, 3 have been joined to each other, the substrate 6 can be immediately subjected to the heating step without having to be reversed or turned upside down. As a result, the semiconductor gas rate sensor can be manufactured efficiently.

Figure 9:
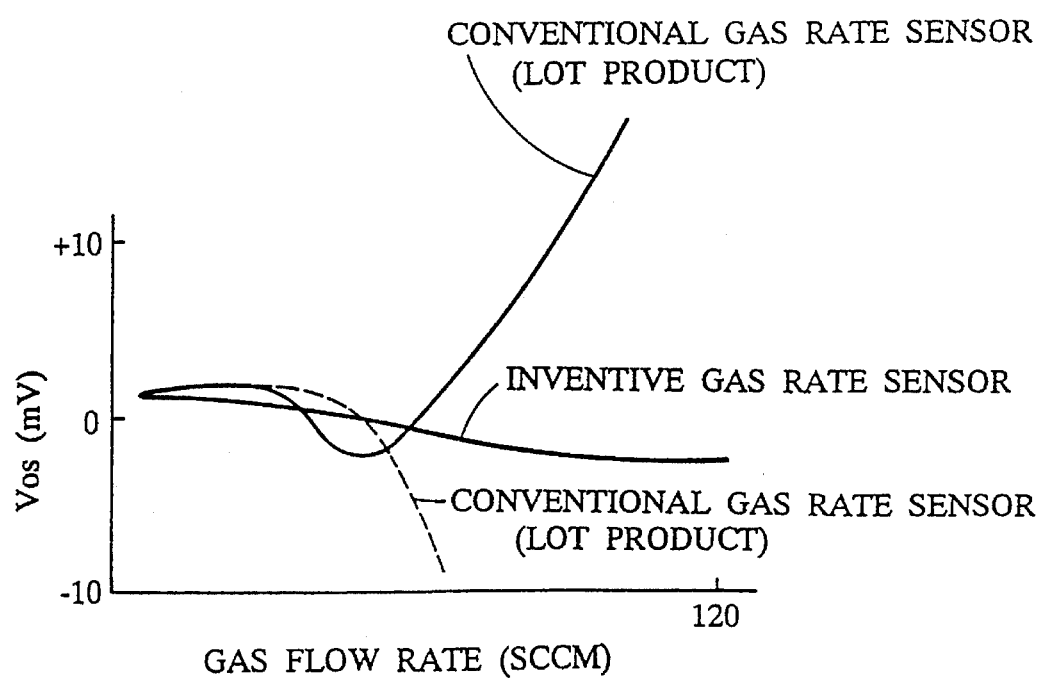
FIG. 9 is a graph illustrative differences between a semiconductor gas rate sensor manufactured by the method according to the present invention and a semiconductor gas rate sensor manufactured by the conventional process.

FIG. 9 is a graph showing the results of an experiment in which a gas flow was ejected from the nozzle 5 into the gas flow passage 4 in each of a semiconductor gas rate sensor manufactured by the method according to the present invention and a semiconductor gas rate sensor manufactured by the conventional process, and the states of the gas flows were detected by the heat wires 7, 8. The graph shown in FIG. 9 has a vertical axis representing the detected signal and a horizontal axis representing the gas flow rate.

As shown in FIG. 9, the detected signal of the semiconductor gas rate sensor manufactured by the conventional process becomes unstable as the gas flow rate increases, and subsequently varies sharply in a positive direction as indicated by the solid-line curve or a negative direction as indicated by the broken-line curve. Such a phenomenon results from the fact that the adhesive layer melted and softened in the initial stage of the heating step sagged into the nozzle 5, making the nozzle 5 asymmetrical in shape, and the asymmetrical nozzle 5 deflected the gas flow thereby to cool only one of the heat wires 7, 8 to unduly change its resistance. Therefore, the semiconductor gas rate sensor manufactured by the conventional process cannot be used as the heat wires 7, 8 detect an angular velocity signal even if no angular velocity acts on the substrate 6. The conventional process thus suffers from a poor yield.

The graph shown in FIG. 9 also indicates that the detected signal of the semiconductor gas rate sensor manufactured by the method according to the present invention remains stable as the gas flow rate increases. This reveals that the adhesive layer melted and softened in the initial stage of the heating step did not flow into the nozzle 5, allowing the nozzle 5 to remain symmetrical in shape, and the symmetrical nozzle 5 permitted the gas flow to pass substantially intermediate between the heat wires 7, 8 without undue deflection thereby cool the heat wires 7, 8 uniformly. Accordingly, the method according to the present invention can manufacture, with a good yield, a semiconductor gas rate sensor which can maintain a good gas flow therein and can detect an angular velocity with high accuracy.

In the illustrated embodiment, the first semiconductor substrate 1 is joined to the second semiconductor substrate 3 while the second semiconductor substrate 3 is being kept underneath the first semiconductor substrate 1. However, the second semiconductor substrate 3 may be joined to the first semiconductor substrate 1 while the first semiconductor substrate 1 is being kept underneath the second semiconductor substrate 3. In such a modification, after the first and second semiconductor substrates 1, 3 have been joined to each other, the substrate 6 is reversed or turned upside down, and then heated.

While the gas flow passage 4 is formed by the recesses 11, 15 which are defined respectively in the first and second semiconductor substrates 1, 3 according to the illustrated embodiment, the gas flow passage 4 may be formed by a recess which is defined in either one of the first and second semiconductor substrates 1, 3.

Although a certain preferred embodiment of the present invention has been shown and described in detail, it should be understood that various changes and modifications may be made therein without departing from the scope of the appended claims.

What is claimed is:

1. A method of manufacturing a semiconductor gas rate sensor including a base composed of a first semiconductor substrate and a second semiconductor substrate bonded thereto by a thermosetting adhesive layer deposited on a mating surface of the second semiconductor substrate, the base having a gas flow passage defined therein and a nozzle defined therein for injecting a gas flow into the gas flow passage, and a detector disposed in and extending across the gas flow passage for detecting a deflected state of the gas flow when an angular velocity acts on the base, the nozzle being formed between a recess defined in mating surface of the first semiconductor substrate and the mating surface of the second semiconductor substrate, said method comprising the steps of:

joining said first semiconductor substrate and said second semiconductor substrate with the thermosetting adhesive layer on the mating surface of the second semiconductor substrate; and thereafter, heating said first semiconductor substrate and said second semiconductor substrate while said second semiconductor substrate is being kept underneath said first semiconductor substrate.

2. A method of manufacturing a semiconductor gas rate sensor including a base composed of a first semiconductor substrate and a second semiconductor substrate bonded thereto and having a gas flow passage defined therein and a nozzle defined therein for injecting a gas flow into the gas flow passage, and a detector disposed in and extending across the gas flow passage for detecting a deflected state of the gas flow when an angular velocity acts on the base, said method comprising the steps of:

fabricating said detector on either a mating surface of said first semiconductor substrate or a mating surface of said second semiconductor substrate;

defining a first recess in either the mating surface of said first semiconductor substrate or the mating surface of said second semiconductor substrate;

defining a second recess in the mating surface of said first semiconductor substrate, said second recess serving as said nozzle when combined with the mating surface of said second semiconductor substrate;

depositing a thermosetting adhesive layer on the mating surface of said second semiconductor substrate;

joining said first semiconductor substrate to said second semiconductor substrate with the thermosetting adhesive layer deposited on the mating surface of said second semiconductor substrate; and heating said first semiconductor substrate and said second semiconductor substrate that have been joined to each other while said second semiconductor substrate is being kept underneath said first semiconductor substrate, thereby setting said thermosetting adhesive layer.

3. A method according to claim 2, wherein said step of joining comprises the step of joining said first semiconductor substrate to said second semiconductor substrate while said second semiconductor substrate is being kept underneath said first semiconductor substrate.

4. A method according to claim 2, wherein said step of depositing comprises the step of transferring the thermosetting adhesive layer from a film onto the mating surface of said second semiconductor substrate.

5. A method according to claim 2, wherein each of said step of defining a first recess and said step of defining a second recess comprises the step of etching the mating surface.

6. A method according to claim 2, wherein said step of fabricating comprises the step of evaporating thermosensitive resistor elements of metal on either the mating surface of said first semiconductor substrate or the mating surface of said second semiconductor substrate across said gas flow passage.

* * * * *